United States Patent
Kamigata (10) Patent No.: US 8,732,441 B2
(45) Date of Patent: May 20, 2014

(54) MULTIPROCESSING SYSTEM

(75) Inventor: Teruhiko Kamigata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 12/558,967

(22) Filed: Sep. 14, 2009

(65) Prior Publication Data

US 2010/0005275 A1    Jan. 7, 2010

Related U.S. Application Data

(63) Continuation of application No. PCT/JP2007/055670, filed on Mar. 20, 2007.

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC ............................................. 712/225

(58) Field of Classification Search
None
See application file for complete search history.

(56) References Cited

U.S. PATENT DOCUMENTS

2005/0273572 A1    12/2005    Takahashi et al. ............ 711/203

FOREIGN PATENT DOCUMENTS

| JP | 2002-99439 | 4/2002 |
|---|---|---|
| JP | 2005-346358 | 12/2005 |
| JP | 2006-99333 | 4/2006 |

OTHER PUBLICATIONS

Daisuke; Translation of JP-2006-099333; Apr. 2006.*
International Preliminary Report on Patentability, mailed Sep. 22, 2009, in corresponding International Application No. PCT/JP2007/055670 (10 pp.).
International Search Report, mailed Jun. 19, 2007, in corresponding International Application PCT/JP2007/055670 (4 pp.).
Written Opinion, mailed Jun. 19, 2007, in corresponding International Application PCT/JP2007/055670 (3 pp.).

* cited by examiner

*Primary Examiner* — Corey S Faherty
(74) *Attorney, Agent, or Firm* — Staas & Halsey LLP (57) ABSTRACT

A multiprocessing system includes a storage part that stores to a memory, a first operating system (OS) task set that is constituted by a combination of a first task and a first OS corresponding to the first task, the first task being designated by an execution instruction; and a task executing part that refers to the first OS task set stored to the memory, loads the OS constituting the first OS task set, and executes the first task designated by the execution instruction.

5 Claims, 9 Drawing Sheets

MULTIPROCESSING SYSTEM

CROSS REFERENCE TO THE RELATED APPLICATIONS

This application is a continuation application of International Application PCT/JP2007/055670, filed Mar. 20, 2007, and designating the U.S., the entire contents of which are incorporated herein by reference.

FIELD

The embodiment discussed herein is related to a multiprocessing system that processes a designated task by static loading.

BACKGROUND

Typically, in an embedded system or a large-scale integration (LSI), a system in which multiple central processing units (CPU) or digital signal processors (DSP) are embedded on a single chip is designed. Such a system is called a multiprocessing system, and is classified into two types, symmetric multiprocessing (SMP) systems and asymmetric multiprocessing (AMP) systems.

Figure 9:
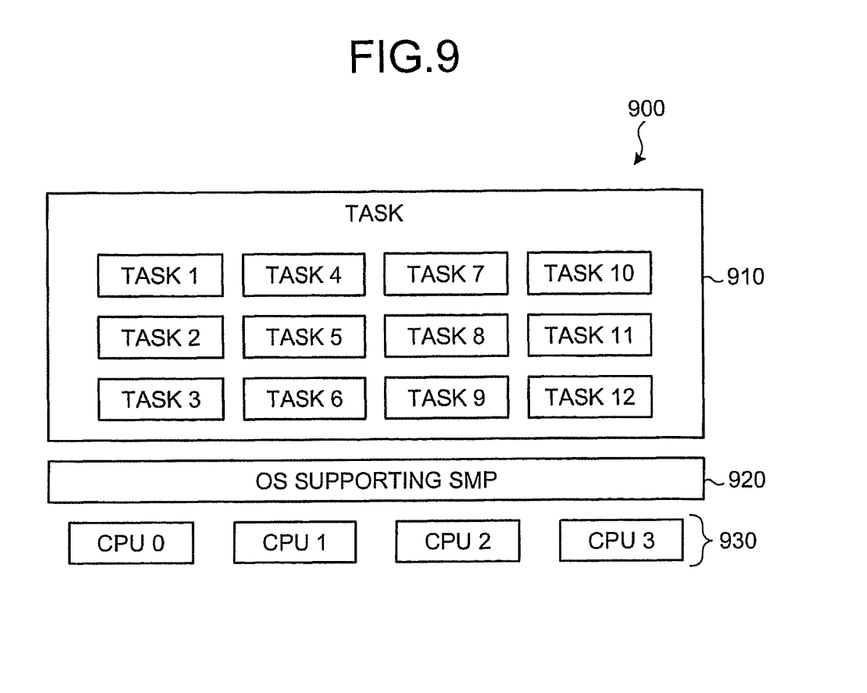
FIG. 9 is a block diagram of an SMP system.

FIG. 9 is a block diagram of an SMP system. In an SMP system 900, basically, multiple CPUs (CPU 0 to CPU 3) 930 can act equally. Accordingly, when the CPUs 930 process a task 910, similar program code may be used. Processing performed by the CPUs 930 of the SMP system 900 may be performed without discrimination between kernel process and user process, and may be performed simultaneously by the CPUs 930.

Moreover, the SMP system 900 requires an operating system (OS) 920 that supports the SMP system. Further, the program code shared in the SMP system 900 is to be usable by a multiprocessor. Such a program that executes exclusive control or execution sequence control dependent on interrupt inhibition and task priority in a system of a single processor cannot work normally in the SMP system 900.

Figure 10:
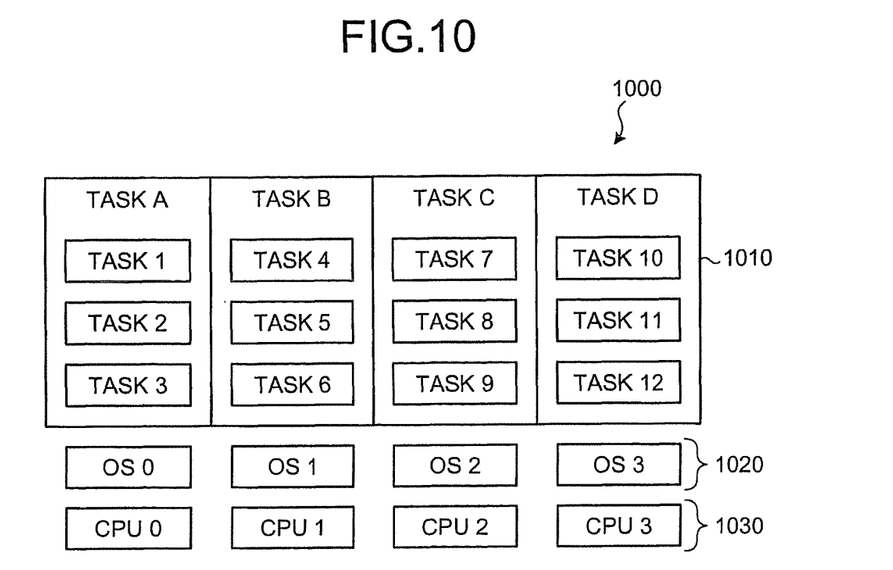
FIGS. 10 to 12 are block diagrams of configuration examples 1 to 3 of an AMP system.
Figure 11:
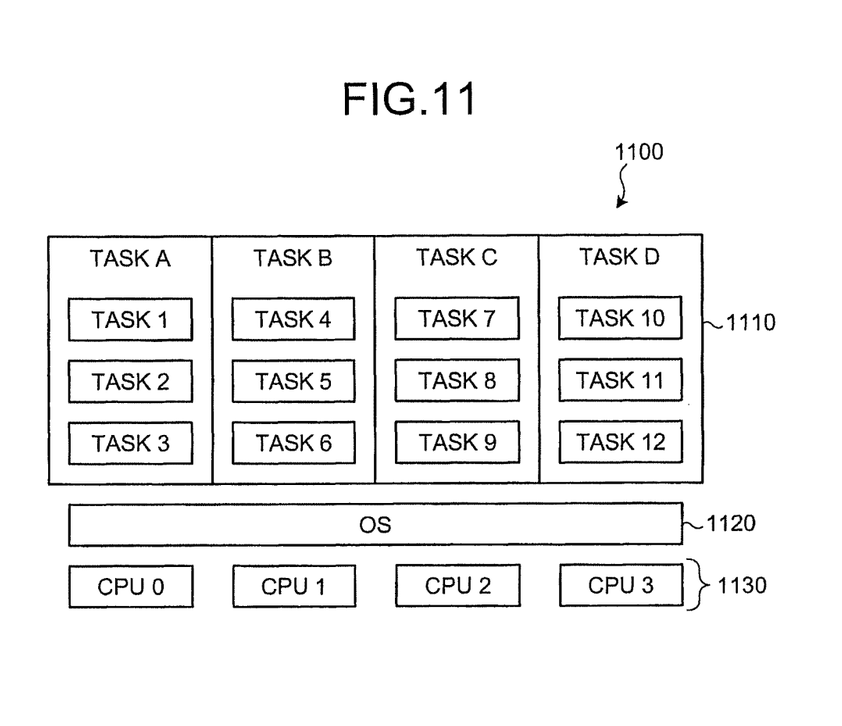
Figure 12:
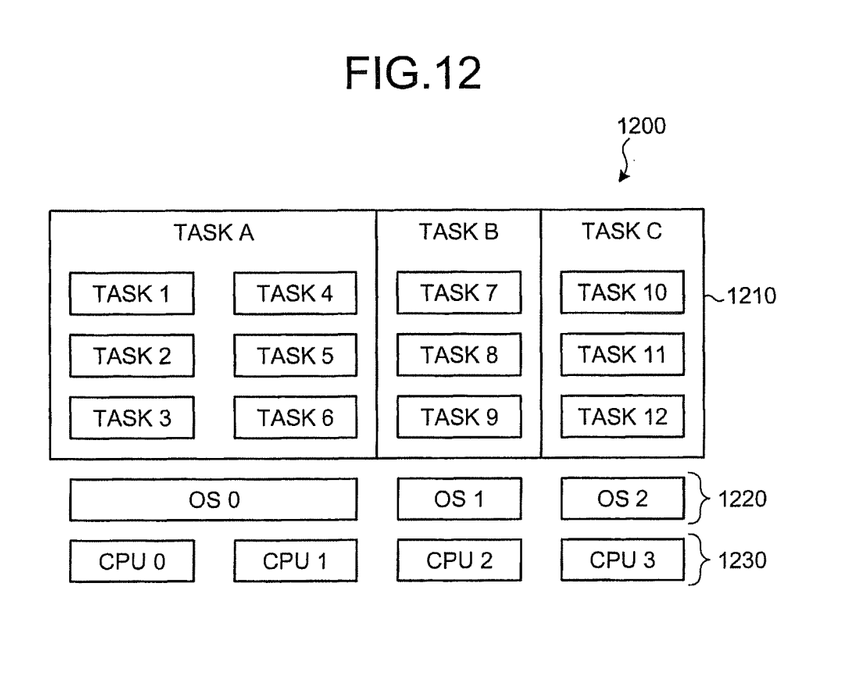

FIGS. 10 to 12 are block diagrams of configuration examples 1 to 3 of an AMP system. An AMP system is a multiprocessing system that is not an SMP system. In an AMP system, roles of respective CPUs are determined such as a CPU executing kernel process and a CPU executing a function of a user application. Furthermore, an AMP system may have various configurations as depicted in FIGS. 10 to 12.

An AMP system 1000 depicted in FIG. 10 includes multiple CPUs (CPU 0 to CPU 3) 1030. CPU 0 to CPU 3 may be of a similar kind or of different kinds, and an OS (OS 1 to OS 3) 1020 is designated for each CPU. In the example of the AMP system 1000, the role of each CPU 1030 is determined as described above, and therefore, a task 1010 of a process subject is also assigned to each CPU 1030, such as a task A (tasks 1 to 3) to be processed by CPU 0, and a task B (tasks 4 to 6) to be processed by CPU 1. In such a case, each CPU 1030 accesses tasks assigned thereto.

An AMP system 1100 depicted in FIG. 11 includes multiple CPUs (CPU 0 to CPU 3) 1130. The respective CPUs 1130 are of a similar kind. As this in example, if the CPUs 1130 are of a similar kind, an OS to be used may be a single type of OS 1120. Therefore, the respective CPUs 1130 process tasks 1110 assigned thereto using an identical OS 1120.

An AMP system 1200 depicted in FIG. 12 includes multiple CPUs (CPU 0 to CPU 3) 1230, where CPU 0 to CPU 1 are of a similar kind. In such a case, CPU 0 and CPU 1 process a task A among tasks 1210 using a common OS 1220 (OS 0). The other CPUs (CPU 2, CPU 3) 1230 process the tasks (tasks B, C) 1210 assigned thereto, using the OS 1220 corresponding thereto.

The configuration of a multiprocessing system includes, for example, a tightly coupled multiprocessor (TCMP) system in which a main memory is shared by multiple CPUs, and the main memory and the CPUs are tightly coupled by a crossbar switch or the like, and a loosely coupled multiprocessor (LCMP) in which a main memory can be shared or not shared by multiple CPUs, and the main memory and the CPUs are loosely coupled.

Generally, if software assets/program assets developed by one existing OS are present in an embedded system, the software assets/program assets are desired to be usable even when the system is changed to a new system. Therefore, a program is loaded by the existing OS. Particularly, when the new system is the AMP system, with respect to programs executed by the slave CPU, it is desirable for the existing programs to be operated on the existing OS as before. In such a case, when the software assets/program assets are to be used, the existing OS is loaded to execute the programs.

When the existing OS is loaded to execute a program, a statically linked scheme and a dynamic linked scheme may be applied. In the static link, a program is divided into modules at the time of creation of the program. After compiling the modules, an object file is linked together with a general purpose library to create a load module (binary) in an executable format. In the dynamic loading, a program is linked to another module or a library when execution of the program is started, or when a routine is called during the operation (for example, see Japanese Laid-Open Patent No. 2002-99439).

When the program is statically loaded, a slave CPU loads all programs that have a potential of being executed. On the other hand, in the case of an OS (Windows (registered trademark), UNIX (registered trademark), Linux, or the like) that supports a virtual memory and that may dynamically load a program and execute by linking thereto, a code shared by multiple tasks in the program is described by a position independent code (PIC), and is dynamically linked at the time of execution, as a shared library (dynamic link library).

However, in the AMP system or the LCMP system described above, there are many programs that use an existing OS that are incapable of dynamic loading. When a program cannot be dynamically loaded, a slave CPU loads all programs (tasks) that may be executed using OS 1, into a main memory in advance when OS 1 is loaded. For this, a memory area to be used for other processing in the main memory decreases. Such program loading may cause a problem in that the processing speed of each CPU becomes slow.

When the above problem occurs, generally, a technique such as a shared library and a dynamic link loader (DLL) is used. A system that realizes this technique implements a virtual memory because an OS uses a paged memory management part (MMU) that manages correspondence between a virtual address space and a real address space in page part.

However, many OSs for an embedded processor represented by an OS of μITRON and the like do not implement a virtual memory. In the OS of μITRON, an OS executed on a CPU and "functions constituting multiple tasks" are normally statically linked. Therefore, a load module often uses absolute addressing.

As described, when a virtual memory is not implemented, an application program statically links all libraries that are used (function is called) by a task itself. When an application program is to be dynamically loaded, all libraries that are used by a task itself are to be statically linked for each application program. That is, C library or the like is to be present for each application program. Therefore, if multiple application programs are executed, a similar library is required to be present as many times as the number of the application programs in an address space of the main memory. This causes a problem in that a large area of the main memory is required.

In addition, to make an application program that has already been developed support the DLL on a new OS, the application program and the OS have to be changed, and a program has to be developed separately, resulting in increased development costs.

SUMMARY

According to an aspect of an embodiment, a multiprocessing system includes a storage part configured to store to a memory, a first operating system (OS) task set that is constituted by a combination of a first task and a first OS corresponding to the first task, the first task being designated by an execution instruction, and a task executing part that refers to the first OS task set stored to the memory, loads an OS constituting the first OS task set, and executes the first task designated by the execution instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment will be explained with reference to the accompanying drawings.

Figure 1:
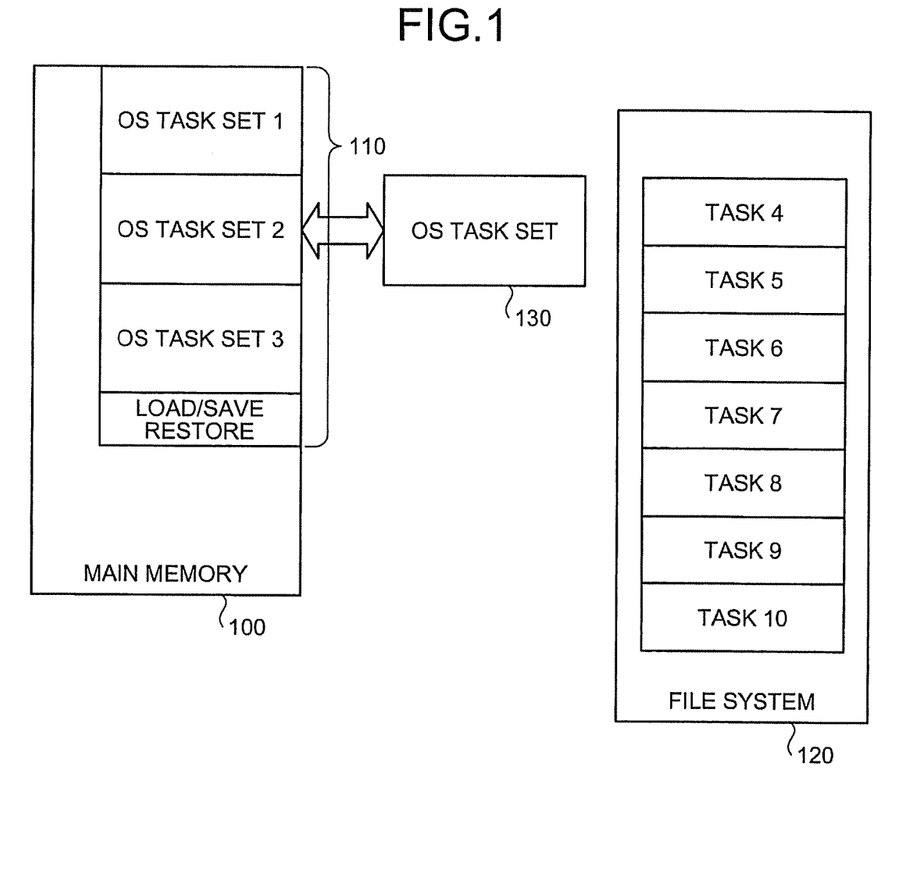
FIG. 1 is a schematic for explaining utilization of a main memory in a multiprocessing system according to an embodiment.

FIG. 1 is a schematic for explaining utilization of a main memory in a multiprocessing system according to an embodiment.

As depicted in FIG. 1, in the multiprocessing system according to the embodiment, an OS task set 110 is loaded into a main memory 100. The OS task set is a combination of an OS to be loaded into a slave CPU and tasks of programs to be executed by the OS. The OS task set is normally stored in a file system 120 in a recording medium that is accessible from the multiprocessing system. Furthermore, the OS and the tasks constituting the OS task set are statically linked.

An OS task set 130 stored in the main memory 100 is read from the file system 120 at the time of execution of the task according to an instruction from a certain processor such as a master CPU. Moreover, in the case of a task frequently executed, the corresponding OS task set is read into the main memory 100.

Figure 2:
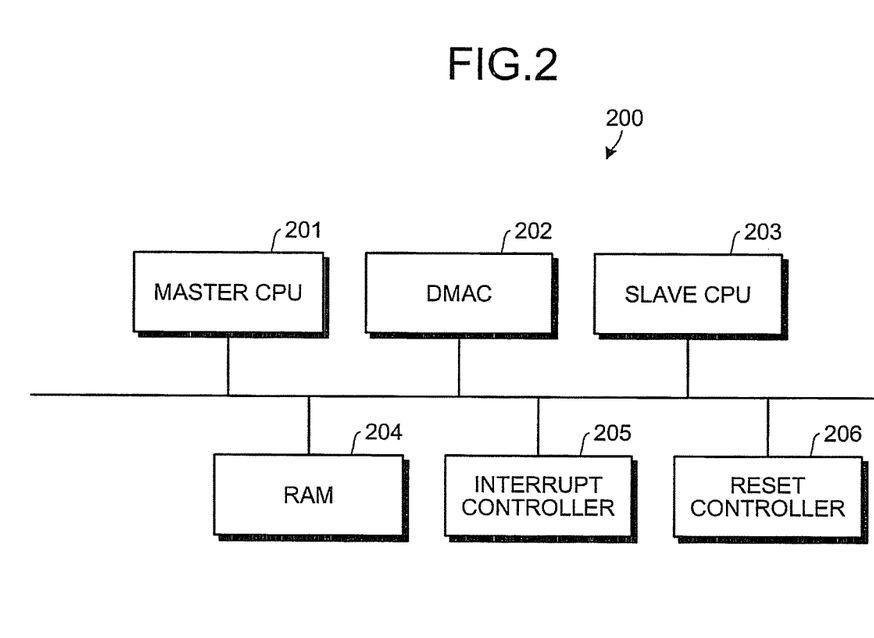
FIG. 2 is a block diagram of the multiprocessing system according to the embodiment.

FIG. 2 is a block diagram of the multiprocessing system according to the embodiment. As depicted in FIG. 2, a multiprocessing system 200 includes a master CPU 201, a direct memory access controller (DMAC) 202, a slave CPU 203, a random access memory (RAM) 204, an interrupt controller 205, and a reset controller 206.

The master CPU 201 controls the entire multiprocessing system. Furthermore, the master CPU 201 causes the slave CPU 203 to execute, in a decentralized manner, tasks as an execution subject. The DMAC 202 is a memory controller for transmission and reception that directly access the RAM 204 to transfer data without going through the master CPU 201 and the slave CPU 203. The slave CPU 203 executes a designated task according to an instruction by the master CPU 201. Functions of the master CPU 201 and the slave CPU 203 are described in detail hereinafter.

The RAM 204 is a fast-access recording medium. The RAM 204 functions as a main memory of the multiprocessing system 200, and is used as a work area of the master CPU 201 and the slave CPU 203.

The interrupt controller 205 performs interrupt processing with respect to a task execution instruction from the master CPU 201 to the slave CPU 203. Upon receiving an interrupt instruction, the interrupt controller 205 causes the master CPU 201 to generate an interrupt request signal, making determination from priority of the interrupt instruction and a masking state. Upon receiving a reset instruction, the reset controller 206 resets corresponding processing of the slave CPU 203.

Next, functions of the master CPU 201 is explained. To cause the slave CPU 203 to execute tasks using the OS task set as depicted in FIG. 1, the master CPU 201 has three kinds of functions, (1) a function of controlling start and stop of execution by the slave CPU; (2) a function of saving and restoring the OS task set operating in the slave CPU; and (3) a function of notifying the slave CPU that the task set is to be changed.

(1) The function of controlling start and stop of execution by the slave CPU is a function of controlling processing to apply and release a reset with respect to the slave CPU, processing to make the slave CPU suspend execution, and processing to execute a task stored at a specified address in the slave CPU 203.

(2) The function of saving and restoring the OS task set executed by the slave CPU 203 is a function of controlling data transfer processing between a memory area that can be accessed by the master CPU 201 and a memory area that can be accessed by the slave CPU 203. For example, a load/store function from the master CPU 201, a DMA data transfer function, and a data transfer function through a local area network (LAN) are included.

(3) The function of notifying the slave CPU that the task set is to be changed is a function of controlling interrupt request processing between the master CPU 201 and the slave CPU 203 and message communication processing between the master CPU 201 and the slave CPU 203. The message communication processing includes, for example, communication of message data between the master CPU 201 and a shared memory that can be accessed by the slave CPU 203, or between the master CPU 201 and the slave CPU 203, and communication of an interrupt processing program that operates on the master CPU 201 and the slave CPU 203.

Next, functions of the slave CPU 203 are explained. To execute a task according to an instruction by the master CPU 201, the slave CPU 203 has four kinds of functions, (1) a function of recognizing a process task in an executing state and an executable state; (2) a function of retaining a list of process tasks in the executing state and the executable state; (3) a function of suspending and resuming execution of a process task in the executing state and the executable state; and (4) a function of resuming or initially starting a process task on the list of process tasks at the time of OS activation.

(1) The function of recognizing a process task in the executing state and the executable state is a function of performing processing to access a management area of a process task operated on the slave CPU 203 and to read and grasp a state of a task.

(2) The function of retaining a list of process tasks in the executing state and the executable state is a function of creating a list of process tasks in the executing state and the executable state, and of storing the list on a memory that can be accessed by the slave CPU 203.

(3) The function of suspending and resuming execution of a process task in the executing state and the executable state is a function of making a process task in the executing state and the executable state into a forcible suspension state (SUSPEND), or resuming a process task that is in the forcible suspension (SUSPEND) state present on the list of process tasks.

(4) The function of resuming or initially starting a process task on the list of process tasks at the time of OS activation is a function of resuming or initially starting a process task on the list of process tasks.

Figure 3:
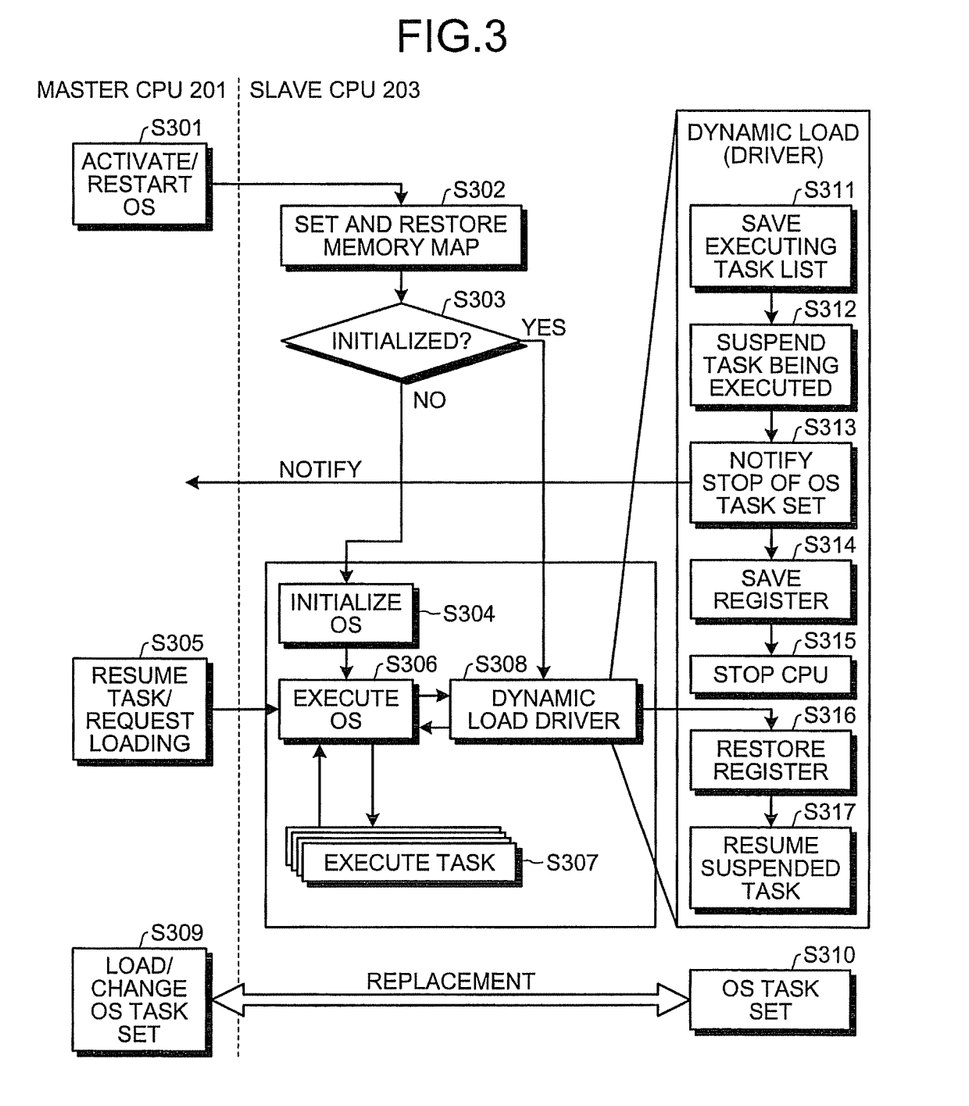
FIG. 3 is a flowchart of task execution processing performed by the multiprocessing system.

FIG. 3 is a flowchart of task execution processing performed by the multiprocessing system.

As depicted in FIG. 3, in the case of the multiprocessing system 100, the slave CPU 203 executes a task triggered by a request from the master CPU 201. In the flowchart depicted in FIG. 3, there are three kinds of triggers: OS activation/restart (S301), task resumption/load request (S305), and OS task set loading/changing (S309) by the master CPU 201. Processing of the slave CPU 203 is explained for each trigger.

When OS activation/restart (S301) is output from the master CPU 201 to the slave CPU 203, setting or restoring of a memory map is first performed (step S302), and it is determined whether the subject OS has already been initialized (step S303). When the subject OS has not been initialized (step S303: NO), OS initialization processing is performed (step S304), and the flow proceeds to OS execution (step S306).

On the other hand, when it is determined that the subject OS has been initialized at step S303 (step S303: YES), the flow proceeds to dynamic load driver processing (step S308). In the dynamic load driver, first, a register is restored (step S316), and a suspended task is resumed (step S317).

The dynamic load driver processing is explained. Processing at steps S311 to S315 performed by the dynamic load driver explained below is triggered by an OS executing state (step S306). First, from the processing at step S306, the list of process tasks in the executing state and the executable state of the OS task set stored in the main memory is created and saved (step S311). The task on the list is brought into the forcible suspension state (SUSPEND) to suspend the execution of the OS task set (step S312).

The slave CPU 203 then notifies the master CPU 201 that the OS task set has been suspended by the processing at step S312 (step S313). Thereafter, the suspension of the task is recorded in a register (step S314), and the slave CPU 203 is stopped as necessary (step S315), for example. Thus, the processing is ended.

Moreover, when the task resumption/load request (S305) is output from the master CPU 201 to the slave CPU 203, the slave CPU 203 executes the OS according to the task resumption/load request at step S305 (step S306). The slave CPU 203 then executes a task that is combined with the OS executed according to the OS task set (step S307). When the OS task set that includes a corresponding program is not executed on the slave CPU 203, the master CPU 201 notifies the slave CPU 203 that the OS task set is to be changed.

Furthermore, when the OS task set loading/changing is output from the master CPU 201 to the slave CPU 203 (step S309), to change the OS task set, the OS task set is loaded from the file system into the main memory, or from another memory that can be accessed by the master CPU 201 into the main memory that can be accessed by the slave CPU 203 (step S310). When the OS task set is changed, a memory map used at the time of reading the OS task set by the slave CPU 203 is changed. The change of the memory map is explained in detail hereinafter.

Figure 4:
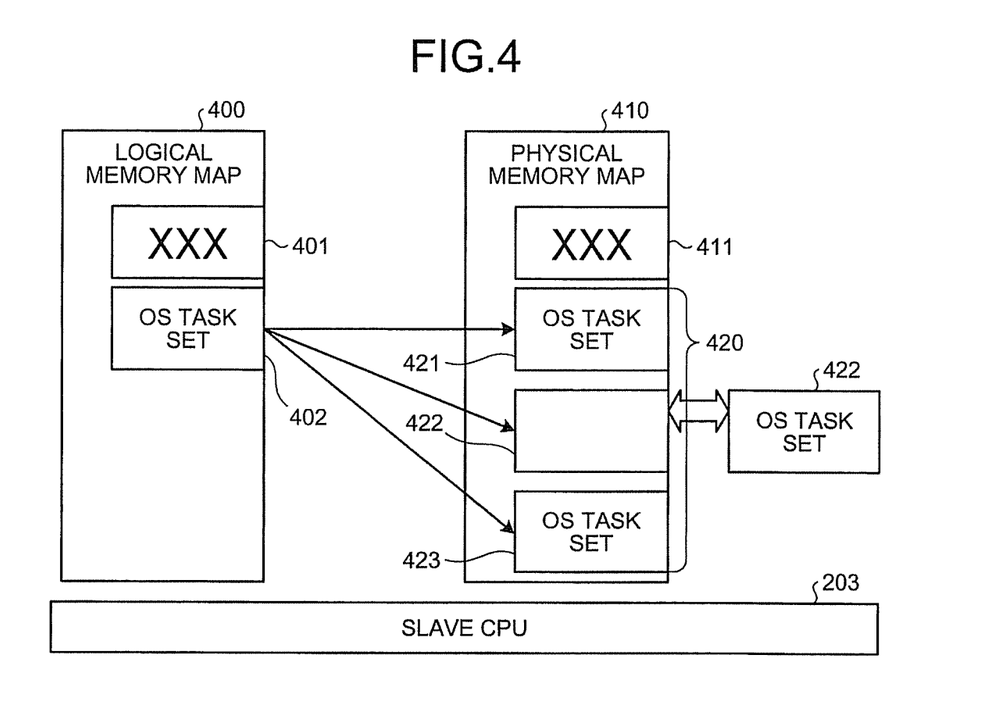
FIG. 4 is a schematic for explaining address conversion processing performed by the multiprocessing system.

FIG. 4 is a schematic for explaining address conversion processing performed by the multiprocessing system. As depicted in FIG. 4, in the slave CPU 203, a logical memory map 400, and a physical memory map 410 are stored.

The logical memory map 400 records, at an address assigned by the slave CPU 203, a logical address that is used when general data 401 or an OS task set 402 is called. Meanwhile, the physical address map records a physical address at which general data 411 or task sets 420 (OS task sets 421 to 423) are stored.

When a task is executed in the slave CPU 203, the OS task set is called with a physical address recorded in the physical memory map 410. Therefore, in a logical address, a corresponding physical address is recorded. However, the physical address is re-written when a storage position is changed. Therefore, re-writing of the physical address is immediately reflected to each logical address in the logical memory map 400. Such an address conversion mechanism enables high-speed change of the OS task set of the slave CPU 203.

To perform the address conversion processing described above, the master CPU 201 and the slave CPU 203 have the following functions, respectively. First, the master CPU 201 has a function of controlling a memory map of the slave CPU 203. The function of controlling a memory map of the slave CPU 203, for example, is a function of performing notification processing to notify the slave CPU 203 to change the memory map.

The slave CPU 203 has (1) an address converting function to hold and change multiple OS task sets, and (2) a function of changing a memory map. (1) The address converting function to hold and change multiple OS task sets is a function of converting a logical address and a physical address. (2) The function of changing a memory map is a function of changing a memory map by manipulating settings of a hardware device that converts a logical address and a physical address.

Next, specific examples are explained using the respective functions of the multiprocessing system described above.

Figure 5:
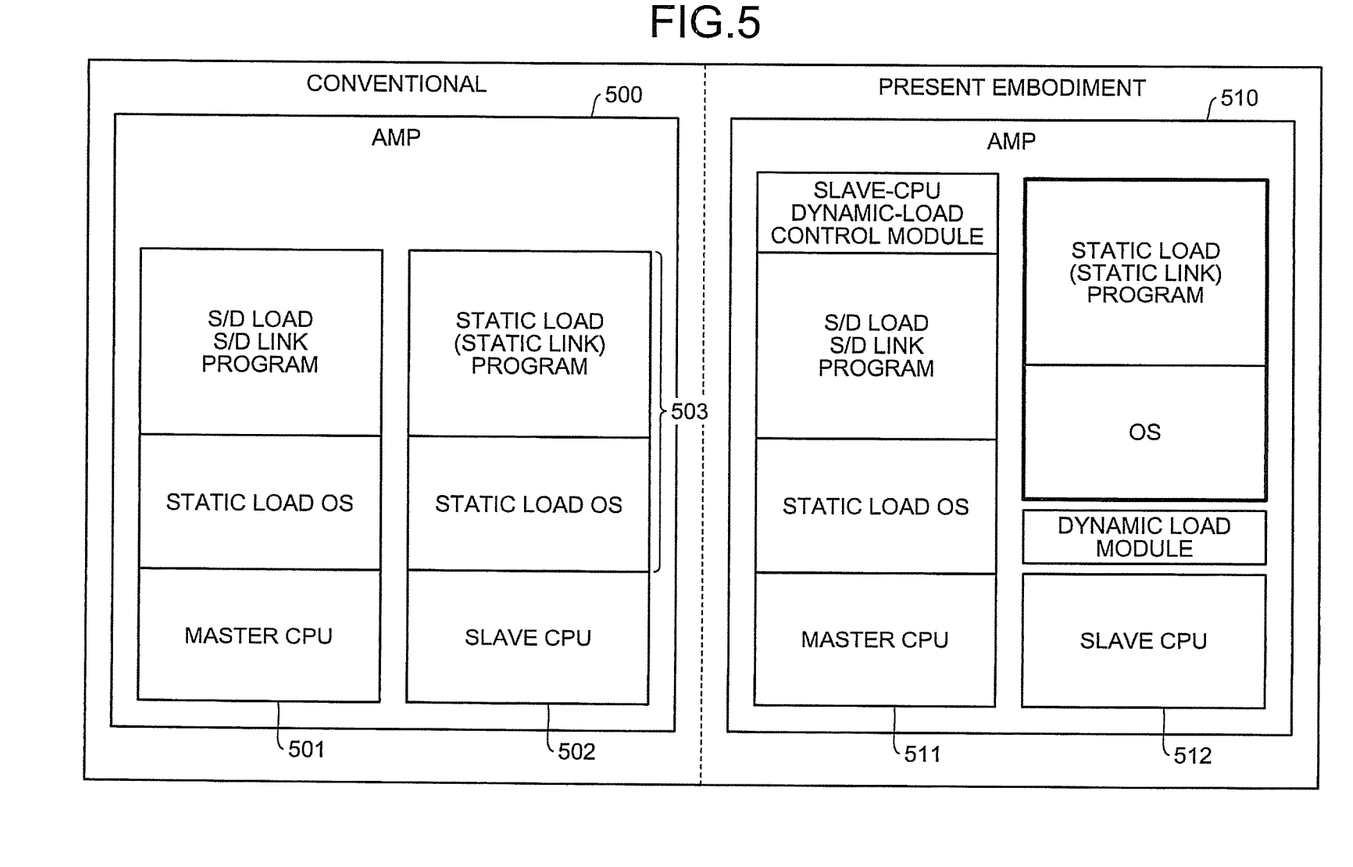
FIG. 5 is a schematic comparing configurations of a master CPU and a slave CPU in an AMP system.

In a first example, an operation when the OS task set described above is applied to the multiprocessing system is explained. FIG. 5 is a schematic comparing configurations of the master CPU and the slave CPU in the AMP system.

In FIG. 5, an AMP system 500 depicts a configuration of a conventional example. On the other hand, an AMP system 510 reflects a configuration of the master CPU and the slave CPU according to the embodiment. In the case of the AMP system 500, a statically loaded OS is provided in each of a master CPU 501 and a slave CPU 502. Therefore, when the slave CPU 502 executes a task, programs 503 in which the statically loaded OS and a statically loaded (statically linked) program are combined are loaded in a main memory together.

On the other hand, in the master CPU 511 of the AMP system 510, a slave-CPU dynamic-load control module is added. This slave-CPU dynamic-load control module enables execution control (start and stop of execution) of the slave CPU 203, control of memory address conversion, and access to the slave CPU.

The slave-CPU dynamic-load control module, for example, realizes three kinds of functions, (1) a function of controlling start and stop of execution by the slave CPU, (2) a function of saving/restoring an OS task set that operates in the slave CPU, and (3) a function of notifying the slave CPU that the task set is to be changed.

Furthermore, in a slave CPU 512 of the AMP system 510, a dynamic load module to respond to the slave-CPU dynamic-load control module is added. This dynamic load module enables recognition of a process task being executed, a list to be saved, suspension and resumption of execution of a task, change of a memory map of the slave CPU, and the like in the slave CPU 512.

Figure 6:
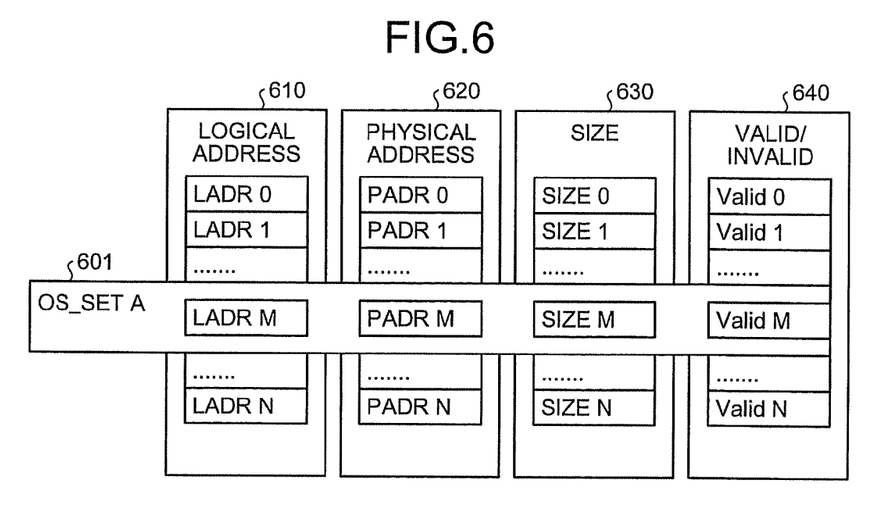
FIG. 6 is a block diagram of an address conversion mechanism.

Next, in a second example, a specific operation when the address conversion mechanism described above is applied to the multiprocessing system is explained. FIG. 6 is a block diagram of the address conversion mechanism. The address conversion mechanism depicted in FIG. 6 is constituted by four registers, a logical address 610, a physical address 620, a size 630, and a valid/invalid 640. The configuration depicted in FIG. 6 is one example and a different configuration may be applied.

In the second example, a memory area is established in which multiple OS task sets operating in the slave CPU may be sorted, and the OS task sets are placed in the memory area. At this time, by using the address conversion mechanism having the configuration as depicted in FIG. 6, change of the OS task sets may be achieved at high speed.

The respective registers record items as indicated below.
Logical address 610: LADR0 . . . N (head of a logical address)
Physical address 620: PADR0 . . . N (head of a logical address)
Size 630: SIZE0 . . . N (size of a memory address area or address mask bits)
Valid/invalid 630: Valid0 . . . N: (validity/invalidity of data)

To manage an OS task set 601, for example, as depicted in FIG. 6, a top address of an area at which the OS task set may be is set to LADR M of OS_SET A (601). Moreover, a physical address at which the OS task set is stored is set to PADR M, the size is set to SIZE M, and "1" or the like is set to Valid M, thereby enabling the address conversion.

Figure 7:
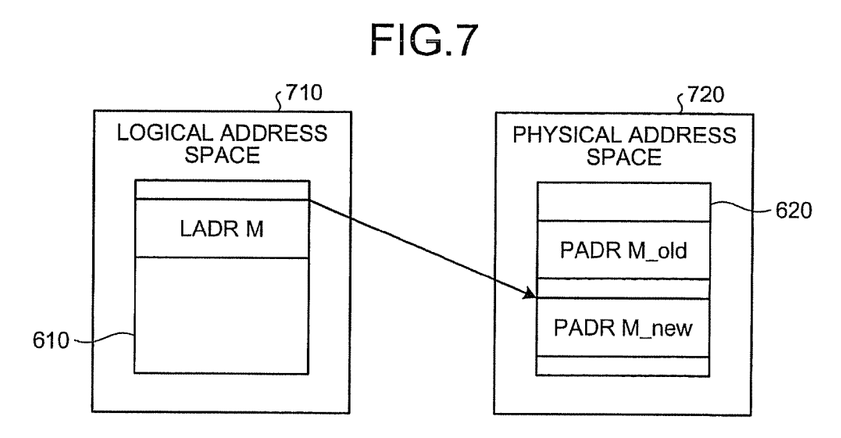
FIG. 7 is a block diagram depicting a modification example of a change of correspondence between the logical address and the physical address.

Furthermore, FIG. 7 is a block diagram depicting a modification example of a change of correspondence between the logical address and the physical address. As depicted in FIG. 7, by changing Valid M, PADR M, and SIZE M, contents of a memory area starting from the logical memory address LADR M of the OS task set executed by the slave CPU can be changed from contents of the physical address PADR M_old to contents of PADR M_new at high speed.

In a third example, a method of changing the OS task set to shorten the processing time by efficiently executing tasks in the multiprocessing system of the first and the second examples describe above is explained.

Figure 8:
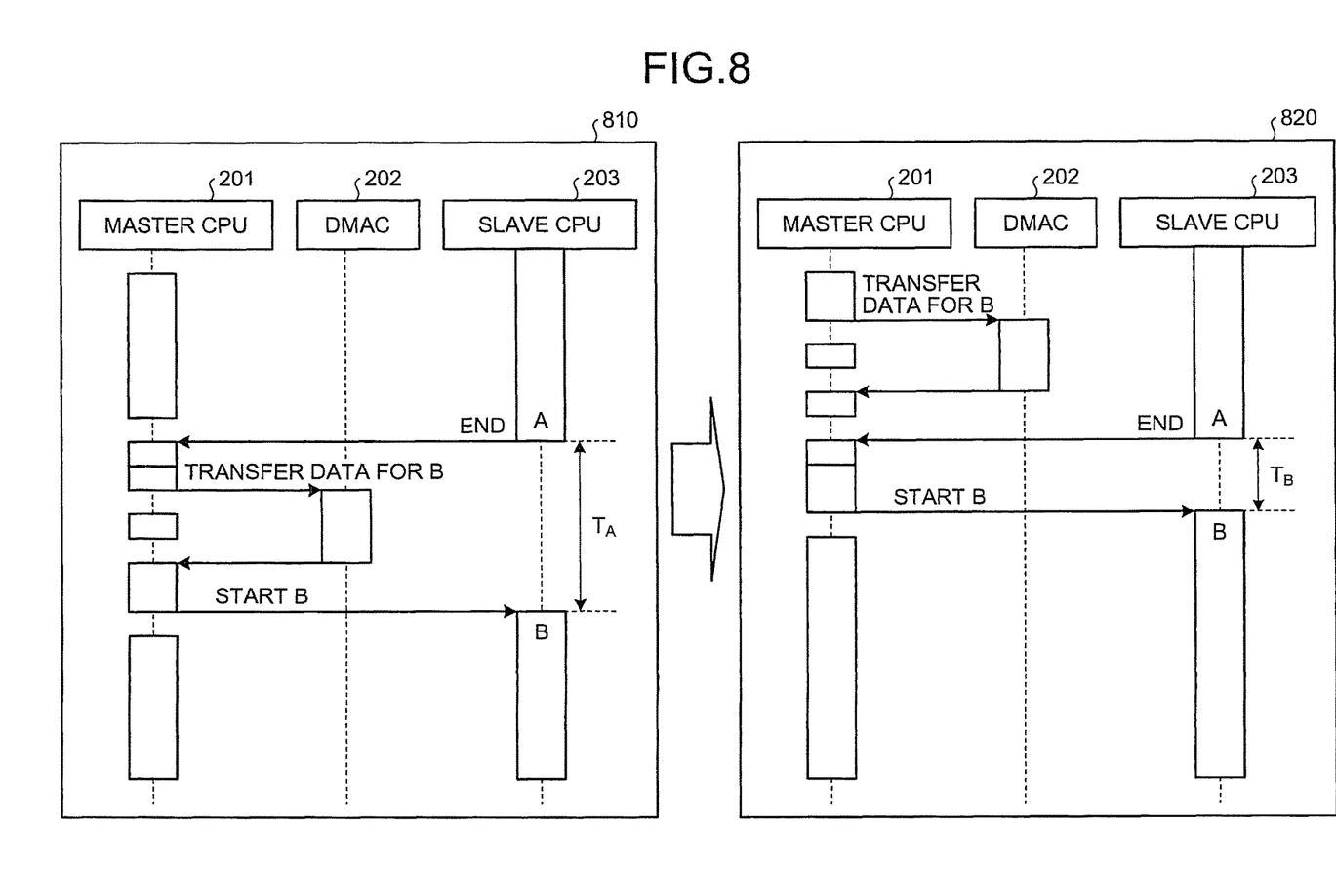
FIG. 8 is a timing chart of change of an OS task set.

FIG. 8 is a timing chart of change of the OS task set. A timing chart 810 indicates normal timing for changing the OS task set. When an OS task set A and an OS task set B are sequentially executed by the slave CPU 203, normally, when the OS task set A is finished in the slave CPU 203, transfer of data of the next OS task set B from the master CPU 201 is started.

When the data transfer of the OS task set B through the DMAC 202 by the master CPU 201 is completed, in response to the completion, processing of the OS task set B is started by the slave CPU 203, i.e., during a period TA from the end of the OS task set A until the start of the processing of the next OS task set B, the slave CPU 203 is in a standby state in which no processing is performed.

On the other hand, in a timing chart 820, while the OS task set A is being executed by the slave CPU 203, the master CPU 201 transfers the data of the OS task set B to be executed next, i.e., the slave CPU 203 can proceed to execution of the OS task set B as soon as the OS task set A is finished and the data transfer from the master CPU 201 is completed. Therefore, a period $T_B$ until the next OS task set B is started is significantly shortened. As described, in the third example, the processing time can be shortened by efficiently executing tasks.

As described, according to the multiprocessing system of the embodiment, when a given OS is used, without loading all corresponding tasks into a main memory, a corresponding OS is loaded when a required task is executed. Therefore, an OS can be changed corresponding to a task without burdening the memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An asymmetric or loosely coupled multiprocessing system comprising:
   a storage part configured by a master central processing unit (CPU) to store to memory, a first operating system (OS) task set that is constituted by a combination of a first task and a first OS corresponding to the first task, the first task being designated by an execution instruction; and
   a task executing part configured by a slave CPU, that refers to the first OS task set stored to the memory, loads an OS constituting the first OS task set, and executes the first task designated by the execution instruction,
   wherein the master CPU replaces the first OS task set stored to the memory with a second task set constituted by a second task and an OS corresponding to the second task, when the first task executed by the slave CPU is changed.

2. The multiprocessing system according to claim 1, wherein
   the memory stores, among the first OS task set and a second OS task set, an OS task set that corresponds to a task that is to be executed among the first task and a second task,
   the slave CPU includes an address converting part that creates a memory map indicating correspondence between a physical address of the OS task set stored in the memory and a logical address of the stored OS task set, and converts the logical address into the physical address by referring to the memory map, and the slave CPU converts, using the address converting part, the logical address of any one among the first OS task set and the second OS task set as indicated by the execution instruction from the master CPU to the physical address and reads any one of the first OS task set and the second OS task set from the memory.

3. The multiprocessing system according to claim 2, wherein the master CPU, when a storage location of any one among the first OS task set and the second OS task set is changed, causes the address converting part to update the physical address accordingly in the memory map.

4. The multiprocessing system according to claim 1, wherein the master CPU, when the slave CPU starts processing of a task designated by the execution instruction, loads an OS constituting an OS task set to be processed by the slave CPU following the designated task.

5. A multiprocessing system comprising:
- a storage part configured by a master central processing unit (CPU) to store to memory, a first operating system (OS) task set that is constituted by a combination of a first task and a first OS corresponding to the first task, the first task being designated by an execution instruction; and
- a task executing part configured by a slave CPU that refers to the first OS task set stored to the memory, loads an OS constituting the first OS task set, and executes the first task designated by the execution instruction,
- wherein the storage part replaces the first OS task set stored to the memory with a second task set constituted by a second task and an OS corresponding to the second task, when the first task executed by the task executing part is changed.

* * * * *